Jan. 7, 1969  J. L. EVANS  3,420,110
GIMBAL PIVOT
Filed Nov. 10, 1965
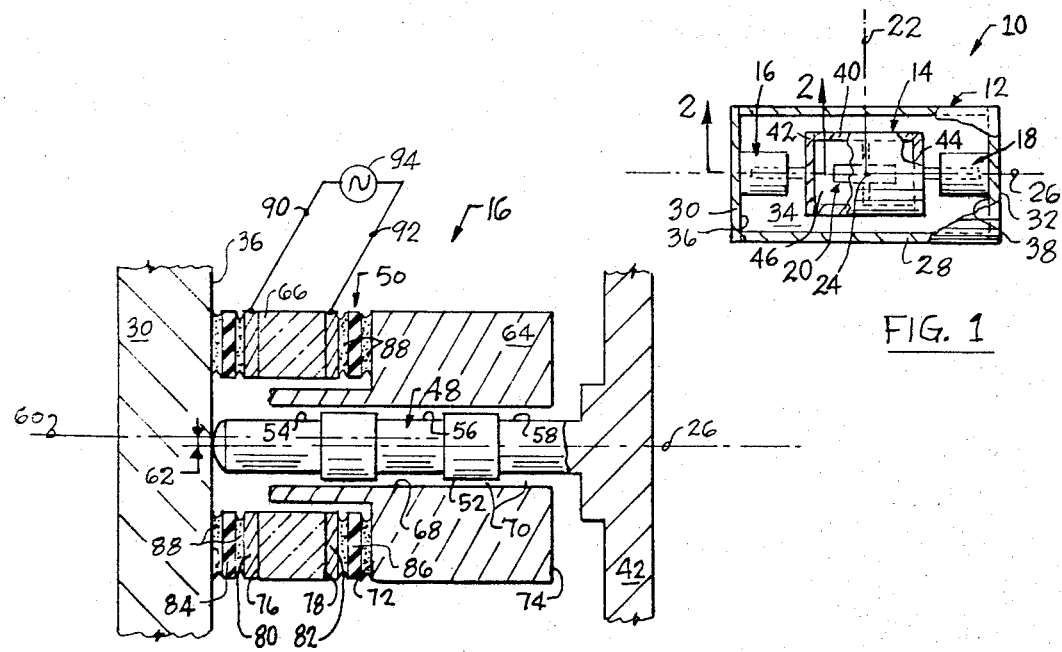
FIG. 1
FIG. 2
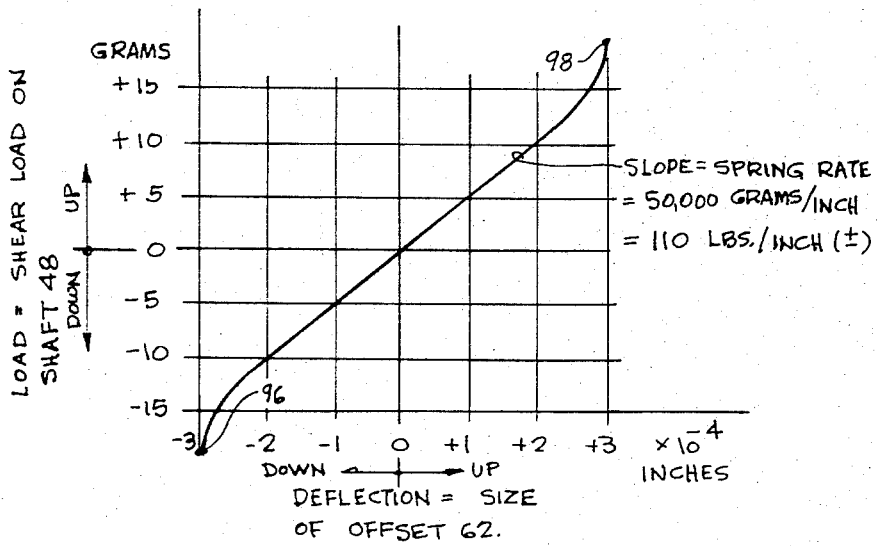
FIG. 3.
JOHN L. EVANS
INVENTOR.
BY Thomas W. Kennedy
ATTORNEY

United States Patent Office 3,420,110
Patented Jan. 7, 1969

3,420,110
GIMBAL PIVOT
John L. Evans, Oakland, N.J., assignor to General Precision Inc., Little Falls, N.J., a corporation of Delaware
Filed Nov. 10, 1965, Ser. No. 507,147
U.S. Cl. 74—5.5       3 Claims
Int. Cl. G01c *19/02*

ABSTRACT OF THE DISCLOSURE

A bearing having a sleeve with a fluid film lining and having a piezo-electric vibrator connected to the sleeve for shearing the fluid film in an axial direction causing the film to apply radial pressure on the sleeve and shaft so as to center the shaft on the sleeve axis.

---

The present invention relates to gyroscope gimbal pivots, and particularly to a fluid-bearing gyroscope gimbal pivot.

A conventional gyro gimbal pivot includes a jewel bearing with a longitudinal axis and with a radially-inner surface and includes a pivot shaft journaled in said jewel bearing with an axis parallel thereto and with a radially-outer surface facing said radially-inner surface. To allow for differential radial temperature expansion, a slight annular gap is normally provided between the shaft and the jewel bearing. One problem with such conventional gyro gimbal pivot is that it is difficult to minimize slight radial displacements of said shaft axis relative to said jewel bearing axis. Some high performance installations cannot even tolerate such a slight radial displacement.

In accordance with one embodiment of the present invention, a slight shifting of the shaft axis relative to the bearing axis is eliminated by using a bearing having a sleeve with a fluid film lining and having a vibrator connecting to said sleeve for shearing said fluid film in an axial direction thereby causing the film to apply a radial pressure on said sleeve and said shaft and thereby centering the shaft axis on the sleeve axis.

Accordingly, it is one object of the invention to eliminate radial shifting of the shaft axis relative to the sleeve axis of a gyro gimbal pivot.

It is another object of the invention to provide a gimbal pivot, which has a spring means between its pivot sleeve and its pivot shaft in order to absorb transverse shock loads passing therebetween.

It is still another object of the invention to provide a gimbal pivot in which the shaft break-away torque is minimized.

To the fulfillment of this and other objects, the invention provides a pivot having a bearing sleeve, a pivot shaft journaled in said sleeve and separated therefrom by an annular gap for containing a fluid film therein, and a vibrator means connecting to said sleeve and said shaft for relative oscillatory displacement therebetween whereby said fluid film is sheared causing a substantial radial pressure in said gap.

Other objects of the invention will become apparent upon reading the following description and the accompanying drawings, wherein like parts are designated by like numerals throughout the several views, and wherein:

FIG. 1 is a sectional view of a single-axis floated gyroscope embodying features of the present invention;

FIG. 2 is a sectional view taken along the line 2—2 of FIG. 1; and

FIG. 3 is a graph of load versus deflection.

Referring to FIG. 1, one embodiment of the present invention is a single-axis, floated gyro 10. Gyro 10 includes an outer gimbal 12, an inner gimbal 14, which is enclosed within outer gimbal 12, a pair of pivots 16, 18 for pivoting inner gimbal 14 relative to outer gimbal 12, and a rotor 20, which is mounted inside inner gimbal 14.

Gyro 10 also has a spin axis 22, which is the axis of rotation of rotor 20, an input axis 24, which is disposed substantially at right angles to spin axis 22, and a longitudinal axis 26, which is disposed substantially at right angles to a plane including axes 22 and 24, and which is also the axis of symmetry of inner gimbal 14.

Outer gimbal 12, which is leak-proof, i.e., a fluid is contained therein, includes a peripheral wall 28, which is substantially symmetrical about axis 26, and has a pair of axially-spaced end walls 30, 32 forming a cavity 34 therebetween, which contains damping fluid (not shown), such as a high-viscosity silicone oil, in which inner gimbal 14 is immersed. End walls 30, 32 have respective axially-inner faces 36, 38, which respectively connect to and support pivots 16 and 18.

Inner gimbal 14, which is substantially leak-proof, also has a peripheral wall 40, which is substantially symmetrical about axis 26, and has a pair of axially-spaced end walls 42, 44, which form a chamber 46 therebetween in which rotor 20 is disposed.

According to the invention, pivot 16, which is substantially identical to pivot 18 and which is described hereafter in detail, has a shaft 48, which is fixedly connected to wall 42, and a sleeve 50, which is fixedly connected to wall 30. Shaft 48 is coaxial with inner gimbal 14 along axis 26; and has a radially-outer surface 52, which has a plurality of annular grooves 54, 56, 58, that have an average depth that is preferably not more than 0.002 inch. Sleeve 50 has an axis 60, which is substantially parallel to axis 26. Axes 26 and 60 have a variable-thickness offset 62 therebetween, which is a maximum thickness during a shutdown condition and which is a minimum thickness during an operating condition. In one model of embodiment 10, the maximum thickness of offset 62 is about 0.002 inch.

Sleeve 50, which has a rigid-type sandwich construction and which is fixedly connected to face 36, includes a metal cylinder 64 and an annular piezo-electric crystal 66, which is connected thereto coaxially therewith along axis 60.

Cylinder 64 has a radially-inner surface 68, which faces outer surface 52 and which is separated therefrom by an annular gap 70. In one model of embodiment 10, gap 70 is about 0.002 inch thickness at zero offset and is about 0.004 inch thickness at a maximum offset. Gap 70 is filled with said damping fluid (not shown). Cylinder 64 also has axially-spaced outer and inner end faces 72, 74.

Crystal 66, which is composed of a conventional piezoelectric ceramic material, such as a lead zirconate titanate material, has axially-spaced outer and inner end faces 76, 78, which have respective metal films or foils 80, 82 that are painted thereon. Foils 80, 82 have respective circular insulator disks 84, 86, which are made of glass, or the like, and which are bonded thereto by an adhesive 88, or like connection Insulator 84 is also bonded to wall face 36 by adhesive 88; and insulator 86 is also bonded to cylinder face 72 by adhesive 88. Foils 80, 82 have respective electric leads 90, 92, which connect to a power supply 94 for driving crystal 66 at its resonant frequency.

FIG. 3 is a plot of test data of one sample of one model of embodiment 10, and shows the variation of transverse deflection versus transverse load. The fluid film in gap 70 acts as a spring that has a straight-line spring rate within certain limits. Such spring rate for the aforementioned sample of embodiment 10 is indicated by the slope of the curve in FIG. 3, which is about 110 pounds per inch. Said curve in FIG. 3 also has terminal points 96, 98, which correspond to the upper and lower locations of shaft 48 relative to sleeve 50 where radially-outer surface 52 contacts radially-inner surface 68.

In operation, supply 94 provides an AC potential through leads 90, 92 and through foils 80, 82 into crystal faces 76, 78, whereby crystal 66 changes its axial dimension at the same frequency as said potential. Crystal 66 actuates cylinder 64 in an axial direction relative to shaft 48. The fluid film in gap 70 is sheared by shaft 48 thereby causing a rise in pressure of said fluid film therein. Thus, sleeve 50 has a radial lift due to its axial motion. Said pressure rise is greatest in the narrow portions of gap 70 between grooves 54, 56 and grooves 56, 58; and said pressure rise is lowest in the wider portions of said gap 70 opposite grooves 54, 56, 58. This pressure rise acts in a radial direction thereby providing a centering effect on shaft 48 relative to sleeve 50 and thereby also increasing the bearing capacity of said pivot 16.

In summary, this invention provides a gyro gimbal pivot in which radial shifting of the pivot shaft axis relative to the pivot sleeve axis is minimized, in which transverse shock loads passing between said pivot shaft and said pivot sleeve is minimized and in which the total break-away torque of said pivot is minimized.

While the present invention has been described in a preferred embodiment, it will be obvious to those skilled in the art that various modifications can be made therein within the scope of the invention. For example, cylinder 64 can have an inductive coil wound around its radially-outer surface, instead of a crystal 66, for oscillating shaft 48 relative thereto. It is intended that the appended claims cover all such modifications.

What is claimed is:
1. A pivot comprising:
   a bearing sleeve with an elongated axis;
   a pivot shaft journaled in said sleeve for oscillation relative thereto and separated therefrom by an annular gap for containing a fluid film therein and having a shaft axis disposed substantially parallel to and offset from said sleeve axis, said shaft having a radially-outer surface disposed on the radially-inner side of said gap, said sleeve having a radially-inner surface disposed on the radially-outer side of said gap, and at least one of said surfaces having an uneven profile relative to the other surface, the offset between said axes being not greater than 0.002 inch; and
   a piezo-electric vibrator sleeve coupled to said bearing sleeve, so that adjacent end faces of said vibrator sleeve and bearing sleeve are in engagement for relative displacement of the sleeve relative to the shaft in axial direction during vibration said vibrator including leads from opposite end faces thereof connecting to an AC supply, the uneven profile of said surfaces varying the thickness of said gap axially during vibration and shearing said fluid film disposed therein.

2. A pivot as claimed in claim 1, in which said radially-outer surface has axially-spaced annular grooves and said radially-inner surface has a substantially-constant inner diameter for ease of shearing said fluid in an axial direction.

3. A pivot as claimed in claim 2, in which the average depth of said grooves is not greater than 0.002 inch.

References Cited
UNITED STATES PATENTS

| | | | |
|---|---|---|---|
| 3,018,142 | 1/1962 | Warnock | 74—5 X |
| 3,046,795 | 7/1962 | Wilkerson | 74—5 |
| 3,171,696 | 3/1965 | Houghton | 308—9 X |
| 3,239,283 | 3/1966 | Broeze et al. | 308—9 |

C. J. HUSAR, *Primary Examiner.*

U.S. Cl. X.R.

308—1